United States Patent
Wootton et al.

(10) Patent No.: US 8,132,265 B2
(45) Date of Patent: Mar. 6, 2012

(54) TECHNIQUES FOR MULTILINGUAL PASSWORD CHALLENGE RESPONSE, PASSWORD RESET, AND/OR PASSWORD RECOVERY

(75) Inventors: Jay D. Wootton, Lindon, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1022 days.

(21) Appl. No.: 12/051,086

(22) Filed: Mar. 19, 2008

(65) Prior Publication Data

US 2009/0241201 A1 Sep. 24, 2009

(51) Int. Cl.
  G06F 7/04 (2006.01)
  H04N 7/16 (2011.01)
(52) U.S. Cl. .............. 726/28; 726/26; 726/27; 713/182; 713/183; 713/184; 707/781; 707/783
(58) Field of Classification Search .................. None
  See application file for complete search history.

(56) References Cited

U.S. PATENT DOCUMENTS

| | | | | |
|---|---|---|---|---|
| 5,341,291 A * | 8/1994 | Roizen et al. ................. | 600/300 |
| 5,995,625 A * | 11/1999 | Sudia et al. ................. | 705/51 |
| 6,151,609 A * | 11/2000 | Truong .......................... | 715/205 |
| 6,343,361 B1 * | 1/2002 | Nendell et al. ................. | 713/171 |
| 6,789,202 B1 * | 9/2004 | Ko et al. ........................ | 726/23 |
| 7,194,765 B2 | 3/2007 | Blom | |
| 7,269,853 B1 * | 9/2007 | Dunn ............................ | 726/27 |
| 7,292,680 B1 * | 11/2007 | Simpson ................... | 379/88.18 |
| 7,325,141 B2 * | 1/2008 | Chow et al. .................. | 713/183 |
| 7,630,974 B2 * | 12/2009 | Remahl et al. ......................... | 1/1 |
| 7,715,532 B2 * | 5/2010 | Simpson ................... | 379/88.18 |
| 7,874,011 B2 * | 1/2011 | Boss et al. ...................... | 726/18 |
| 7,930,735 B2 * | 4/2011 | Vigelette et al. .................. | 726/6 |
| 2002/0046359 A1 * | 4/2002 | Boden ............................... | 714/6 |
| 2004/0006478 A1 * | 1/2004 | Alpdemir et al. ............. | 704/275 |
| 2004/0019609 A1 * | 1/2004 | Orton et al. ................ | 707/104.1 |
| 2004/0078775 A1 * | 4/2004 | Chow et al. ..................... | 717/100 |
| 2006/0136317 A1 | 6/2006 | Mizrah | |
| 2007/0239730 A1 * | 10/2007 | Vigelette et al. ................ | 707/10 |
| 2007/0271601 A1 | 11/2007 | Pomerantz | |
| 2008/0075239 A1 * | 3/2008 | Simpson ................... | 379/88.02 |
| 2008/0134317 A1 * | 6/2008 | Boss et al. ...................... | 726/18 |
| 2009/0089876 A1 * | 4/2009 | Finamore et al. ............... | 726/21 |
| 2009/0217368 A1 * | 8/2009 | Buss et al. ........................ | 726/9 |
| 2011/0026688 A1 * | 2/2011 | Simpson ................... | 379/88.02 |

OTHER PUBLICATIONS

M. Just, "Desiging and Evaluating Challenge Question System," IEEE Computer Society, 2004, pp. 1-8.*
Furnell et al., "Replacing Password: In Search of the Secret Remedy," Network Security, Jan. 2006, pp. 1-5.*
S. Furnell, "An Assessment of Website Password Practices," Computer & Security, 2007, pp. 445-451.*
B. Marshall, "Tips for Avoiding Bad Authentication Challenge Questions," Security Professional Service, Inc., Jul. 2007, pp. 1-15.*

* cited by examiner

*Primary Examiner* — Luu Pham
(74) *Attorney, Agent, or Firm* — Schwegman, Lundberg & Woessner, P.A.

(57) ABSTRACT

Techniques for multilingual password challenge response, password reset, and/or password recovery are presented. When a password reset or password recovery request is received, a series of challenge questions are serially asked such that each question has to be answered correctly before the next question in the series is even presented. Furthermore, at least two questions are asked in different languages from one another.

25 Claims, 3 Drawing Sheets

TECHNIQUES FOR MULTILINGUAL PASSWORD CHALLENGE RESPONSE, PASSWORD RESET, AND/OR PASSWORD RECOVERY

BACKGROUND

Network intruders are increasingly becoming more sophisticated in their attempts to gain access to user passwords for access to user systems. But, today users conduct nearly all aspect of their lives over the Internet and the World-Wide Web (WWW). For example, it is not uncommon for a typical user to perform: check writing, credit card transactions, banking, purchasing of goods or services, selling of goods or services, personal communication, etc. via a variety of online system. Each system typically requires a valid user identification (id) and a password combination to authenticate and access a user's account with that system.

Users often have a multitude of user ids and passwords that they actively manage. Sometimes, a user may access a system and then not reattempt to access that same system for several months or even years. So, it is very common for a user to forget his/her password to any particular system. Moreover, even when a user does not forget his/her password, a particular system may require a changed password every so often, such that when a user returns to a system after some extended absence that user's prior password is no longer valid.

As a result, there are a variety of reasons why a user may want to have his/her password reset with a particular system. Most systems have an automated mechanism by which a user can reset his/her password. These generally just require that the requestor have a valid user id and be capable of answering some predefined challenge questions.

Just about everyone who uses the Internet has encountered these questions before and they are usually along the lines of: what is your favorite pet's name; what is your mother's maiden name; etc. In fact, some systems may only ask a single question that if answered correctly results in either the retrieval of an existing valid password for the user or results in an existing password being terminated and reset with a new temporary access password.

Thus, it can be extremely easy for an intruder or hacker to cause a considerable about of grief and damage to a user. In fact, some systems even automatically freeze out a password and require a manual reset request when three failed passwords are supplied in an attempt to access those systems. An intruder simply provides three bogus passwords or one repetitively invalid password and knows the valid user is now going to be frozen from his/her account with a system. Now, the intruder is assured that the user will not be in the account when the intruder uses the password reset mechanism to request that the password be reset. This is done by the intruder supplying the valid user id (which is often publicly known and not kept secret) and then going through the automated mechanism supplied by the system of the user for password reset. The intruder may fail on a first attempt at a password reset but in the process acquires the secret question that if answered correctly will get the password reset on subsequent intruder attempts. A little investigation over the Internet or a few more failed attempts can easily result in the intruder finding the correct answer to the secret question; at which point, the intruder resets the user's password and gains access to the user's private account on the system.

This is but one simple example and a variety of other scenarios exists, which are known in the industry so as to permit an intruder to discover and access a user's account to a system. The security issues with all these scenarios revolve around the automated mechanisms that systems use for: password challenge response, password recovery and password reset.

Thus, improved techniques are needed for procedures associated with password challenge responses, password resets, and/or password recoveries.

SUMMARY

In various embodiments, techniques for multilingual password challenge response, password reset, and/or password recovery are presented. More specifically and in an embodiment, a method is provided for establishing a password reset and recovery procedure for a user. Two or more challenge questions are selected for a user, the answers to these questions are associated with an automated procedure that recovers an existing password from the user to a system or resets the existing password to a new password. Next, a first spoken language is set; the first spoken language is for the questions that are to be asked. Also a second spoken language is set; the second spoken language is for the answers are to be received in from the user during the automated procedure in response to the questions asked. The first spoken language is different from the second spoken language. Finally, the automated procedure is established so that during the automated procedure a requestor supplies a valid user identification for the user and a first one of the questions is presented in the first spoken language to the requester and a first answer is expected from the requester in the second spoken language. When the first answer agrees with what is expected, a second one of the questions is then presented in the first spoken language to the requester and a second answer is expected from the requester in the second spoken language. When the second answer also agrees with what is expected, the existing password is supplied to the requestor or the new password is supplied to the requester. Furthermore, the second one of the questions is never presented to or discoverable by the requestor when the first answer to the first one of the questions is not what was expected.

DETAILED DESCRIPTION

A "spoken language" as used herein refers to a communication language used by humans to communicate verbally and in writing. In other words, a spoken language is not to be construed as a computer or machine language. Additionally, a spoken language is not to be construed as being audibly presented to a user; rather the spoken language is presented in text and written format for the country or dialect to which it relates. Some example spoken languages include, but are not limited to: English, Spanish, French, Japanese, Hindi, Russian, Chinese, Italian, etc.

Various embodiments of this invention can be implemented in existing network security architectures. For example, in some embodiments, the techniques presented herein are implemented in whole or in part in the Novell® network and proxy server products, directory services products, operating system products, and/or identity based products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

Figure 1:
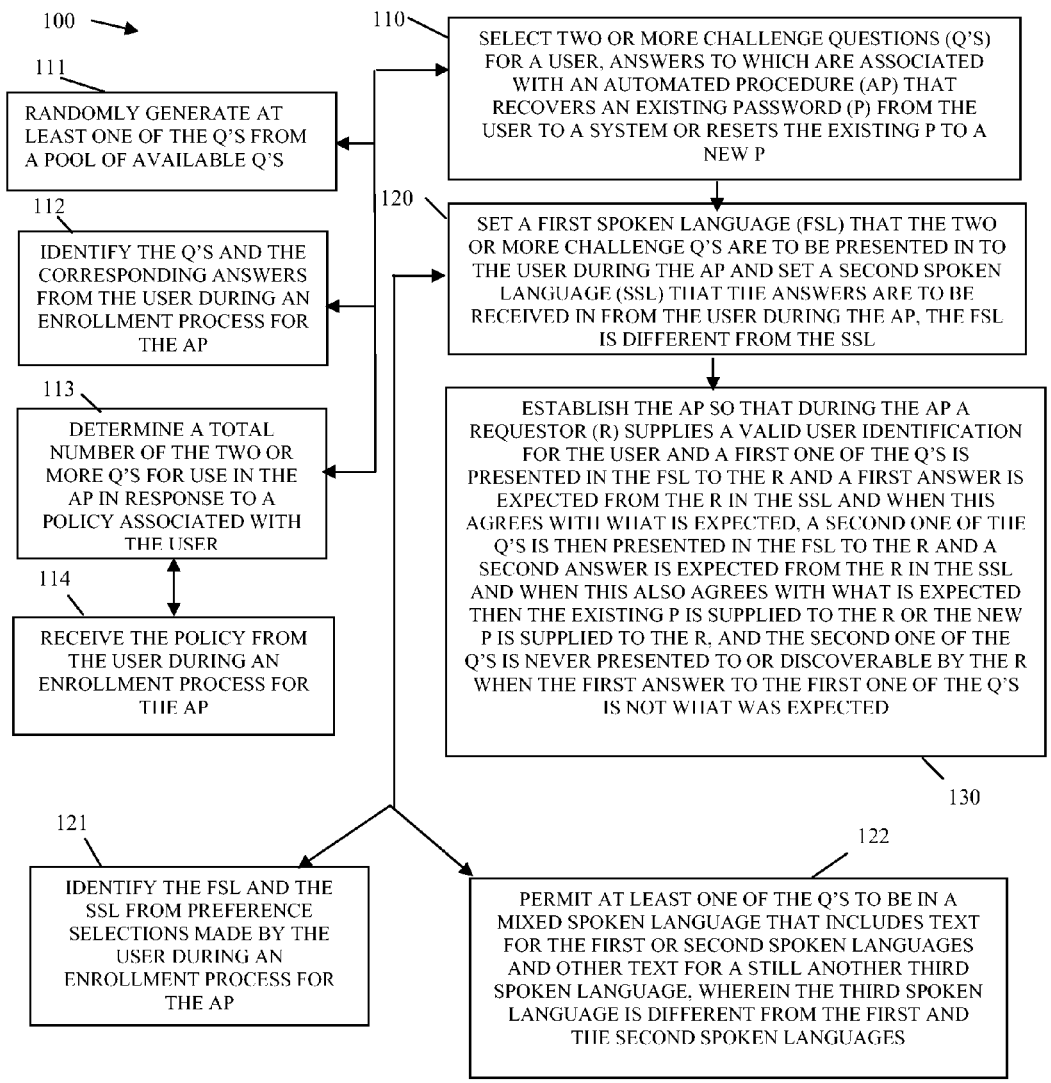
FIG. 1 is a diagram of a method for establishing a multilingual password reset and recovery procedure for a user, according to an example embodiment.

FIG. 1 is a diagram of a method 100 for establishing a multilingual password reset and recovery procedure for a user, according to an example embodiment. The method 100 (hereinafter "establishment service") is implemented in a machine-accessible and readable medium. The establishment service is operational over and processes within a network. The network may be wired, wireless, or a combination of wired and wireless.

It is noted that there are two types of users defined herein: an end user that refers to the user for which the password services are being supplied to and an administrator that interacts with the password service to define password policy for the end user.

At 110, the establishment service selects two or more challenge questions for a user. The challenge questions can be any standard question defined by an enterprise policy, such as pet's name, birthdate, favorite pet, favorite sport, mother's maiden name, birth city, etc. In addition, the challenge questions can be end-user defined or administrator defined, such as first car, first girlfriend's name, etc. The challenge questions are in text format and when presented to an end user via an interface, such as a World-Wide Web (WWW) page over the Internet, the challenge questions can be read.

The answers to the challenge questions are associated with an automated procedure that permits a requester to recover an existing password for a valid end user or to reset and the existing password to an entirely new password.

According to an embodiment, at 111, the establishment service randomly selects at least one of the questions from a pool of available questions associated with a particular end user. That is, there may be hundreds or tens of questions to choose from and the establishment service randomly selects at least one (can be more than one) question from the pool of available questions.

In one case, at 112, the establishment service identifies the questions and the corresponding answers that are expected in response to those identified questions from the end user during an initial enrollment process for the automated procedure. So, the end user can drive the questions that are asked; whether they are random or not; etc. during the enrollment process. It is noted that an administrator may also play a part in what can be done by the end-user in the enrollment process. So, the administrator may dictate what questions the end user can identify and may mandate that some questions always be asked.

In an embodiment, at 113, the establishment service determines a total number of the two or more questions for use in the automated procedure in response to a policy associated with the end user. The administrator may set the policy. For example, a policy associated with the end user may indicate that there are to be 5 questions asked, some are preset and some are randomly selected from a pool of available questions.

Additionally, at 114, the establishment service can receive the policy from the end user during an enrollment process that is associated with the automated procedure. This occurs when overriding policy defined by an administrator permits such a situation.

At 120, the establishment service sets a first spoken language that the two or more challenge questions are to be presented in to the end user during the automated procedure. It is noted that the first spoken language can change to a different spoken language from question to question that is asked and this can happen in a random fashion from question to question. Furthermore, the establishment service sets a second spoken language that the answers supplied by the end user during the automated procedure are to be in. The first spoken language is different from the second spoken language. So, the language that the challenge questions are presented in during the automated procedure for resetting or recovering a password is different than the language that the end user or subsequent requester uses to supply the answers in. Thus, the automated procedure for challenge response is multilingual.

For example, the establishment service can determine that the challenge questions for the automated procedure are to be set in English and the answers supplied during the automated procedure are to be set in Spanish. So, if one question is: what is the name of your dog? An acceptable answer may be: me perro llamas Sophie (my dog is named Sophie in Spanish). The question itself may also have been generated randomly during the automated procedure.

In an embodiment, at 121, the establishment service identifies the first spoken language from preference selections made by the end user and/or administrator during an enrollment process for the automated procedure.

Additionally, in some cases, at 122, the establishment service permits at least one of the questions to be in a mixed spoken language that includes text from the first or second spoken languages and other text for still another third spoken language that is different from the first and second spoken languages.

By mixing the spoken languages in presenting questions and when questions are answered, it becomes extremely difficult for an intruder to detect a pattern and figure out what is expected and in what language it is expected. This obviously provides enhanced security for a system or service that requires password access and that provides a password reset and recovery procedure.

At 130, the establishment service establishes the automated procedure so that during the automated procedure a requester supplies a valid user identification for the end user. In response, the automated procedure (created and configured by the establishment service) presents a first challenge question in the first spoken language to the requester. A first answer is received in the second spoken language. If the first answer is correct, then and only then the second challenge question is presented to the requester in the first spoken language format. Again, the requestor supplies a second answer in the second spoken language format. If the second answer is correct (in terms of content and language format), then (assuming no more questions are required by the automated procedure) the automated procedure supplies the existing password or supplies a new password to the requester. The requester does not see the second question when the first question is not properly answered and does not see any third or more questions when the previous questions were not answered properly.

It is noted that some systems may never store the actual password of an end-user but rather a hash is stored. In such systems, the password will have to be reset and cannot be recovered as it is not known. Also, when a new password or reset password is supplied the end-user may be required on initial access to the system under the new password to reset it to something defined by the user.

So, the requester cannot harvest questions to determine answers in advance of the questions themselves. Moreover, if some questions are random then on second attempts by a requester the same questions may not even appear or may appear in different sequences entirely. Here again, an intruder will find it very difficult to detect a pattern and will find it very difficult to determine in advance what is expected to break through and get a password or have a password reset to an entirely new password.

The establishment service describes how the initial automated procedure for a end user to recover or reset a password is configured and initially established. The actual processing scenarios associated with the automated procedure are now discussed below with reference to the FIG. 2.

Figure 2:
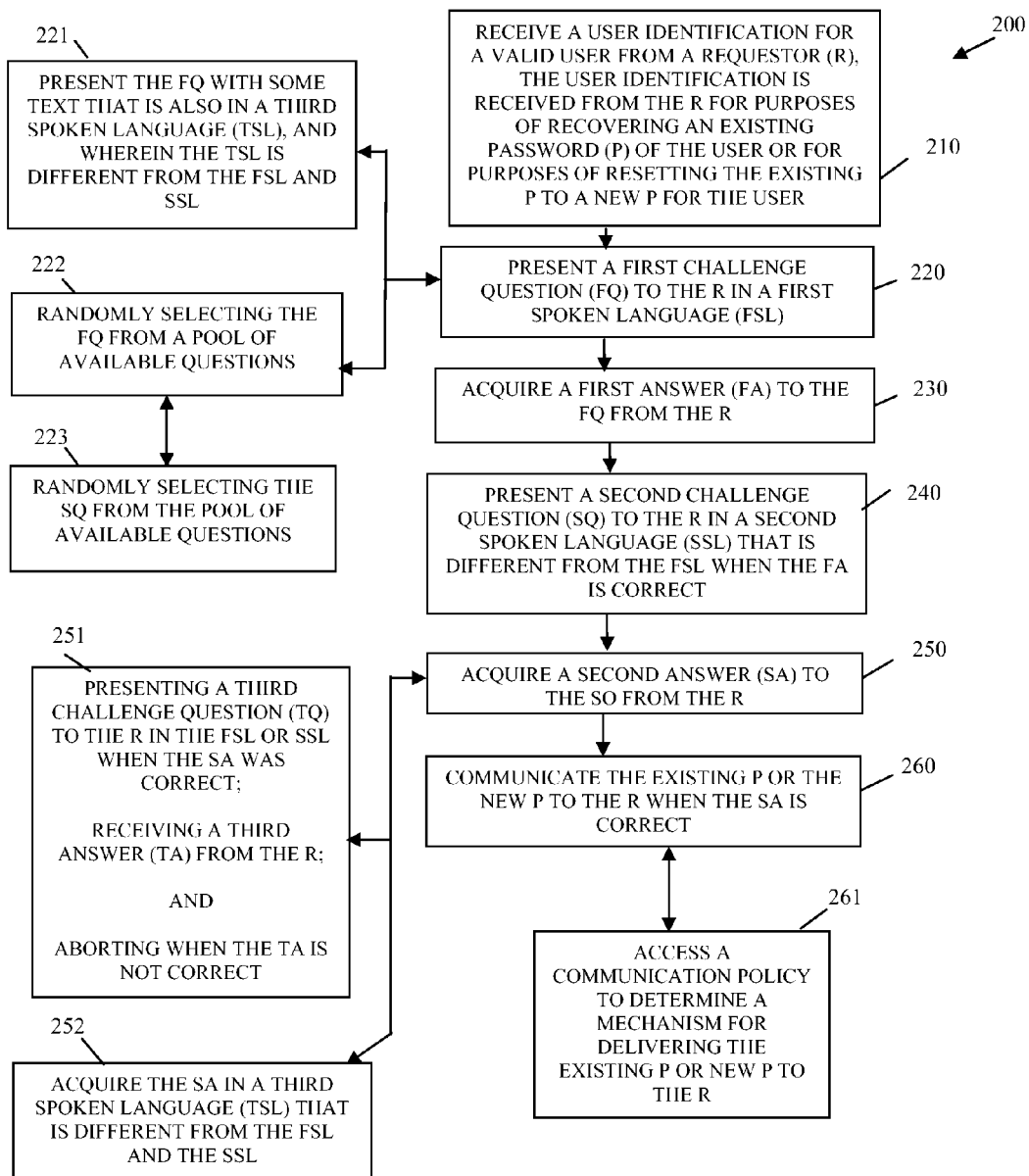
FIG. 2 is a diagram of a method for processing a multilingual password reset and recovery procedure, according to an example embodiment.

FIG. 2 is a diagram of a method 200 for processing a multilingual password reset and recovery procedure, according to an example embodiment. The method 200 (hereinafter "password service" is implemented in a machine-accessible and readable medium and is operational over a network. The network may be wired, wireless, or a combination of wired and wireless.

In an embodiment, the password service uses the automated procedure for password recover or reset defined and created by the establishment service, which is represented by the method 100 of the FIG.1 and which is discussed above.

At 210, the password service initially receives a user identification for a valid end user of a system or service that the password service provides authentication services for. The user identification is received by a requester that desires to reset the valid end user's password to a new password or that desires to recover an existing password for the valid end user when the valid end user forgets the password. The requestor may or may not be the valid end user, but the processing of the password service as described herein will make it extremely difficult for the requester to be anyone but the valid end user, which is what is most desirable for improved security to the system or service.

At 220, the password service presents a first challenge question to the requester in a first spoken language.

In some cases, at 221, the password service presents the first challenge question with some text that is also in a third spoken language. The third spoken language is different from the first and second (discussed below) spoken languages. This is a challenge question in a mixed-language format.

Moreover, in an embodiment, at 222, the password service randomly selects the first question from a pool of available questions. Similarly, at 223, the password service randomly selects the second challenge question (again discussed below) from the pool of available questions. So, the questions may be resolved dynamically on a session bases by the password service, such that on a second attempt for a different session by the requester, the password service may use entirely different first or second challenge questions.

At 230, the password service acquires a first answer for the first question from the requester. The first answer can be in the first spoken language, the second spoken language, the third spoken language, or even a fourth and different spoken language. Policy dictates what spoken language format that the password service expects to see the first answer presented in from the requester in response to the first question that was asked in the first spoken language format.

If the first answer is incorrect in terms of its content or incorrect in terms of the spoken language format that is expected by the password service, then the processing aborts and stops. Log and report processing may take place in response to policy when the first answer is incorrect in terms of content or spoken language format.

Assuming the first answer is correct and is what was expected by the password service, at 240, the password service presents a second challenge question to the requestor in a second spoken language. The second spoken language is different from the first spoken language. For example, the first spoken language can be English and the second spoken language is Spanish.

At 250, the password service acquires as a second answer to the second question from the requester. Policy dictates the spoken language format that the second answer is expected to be in by the password service.

According to an embodiment, at 251, the password service presents a third challenge response question to the requester. That third question is in the first spoken language format or the second spoken language format. The third question is never presented unless the second answer was correctly received from the requester in terms of content and expected spoken language format. When the third question is presented, a third answer is received from the requestor and the processing is aborted when the third answer is not correct in terms of expected content and spoken language format.

It is noted that the processing discussed at 251 can occur multiple times for additional questions and answers. The number of iterations is driven by policy associated with the user.

In an embodiment, at 252, the password service acquires the second answer in a third spoken language format. The third spoken language format is in a different spoken language format from that which is defined for the first and second spoken languages format.

So, it is clear that the password service employs a multilingual format for password recovery and reset.

At 260, the password service communicates the existing password or the new password (established in response to resetting an existing password) when the second answer was correct in terms of its expected content and spoken language format.

It is noted that at any point in time when an answer is not correct in terms of content or expected spoken language format, the password service aborts and does not present a next question associated with establishing the password recovery or reset.

In an embodiment, at 261, the password service accesses a communication policy to determine a mechanism for delivering the existing password that is being recovered or delivering a new password created in response to resetting the existing password. The communication mechanism may include, but is not limited to, a link to secure WWW page, an email, a text message, an instant message, etc. Moreover, the mechanism may include some form of encryption or digital signature verification for added security.

Figure 3:
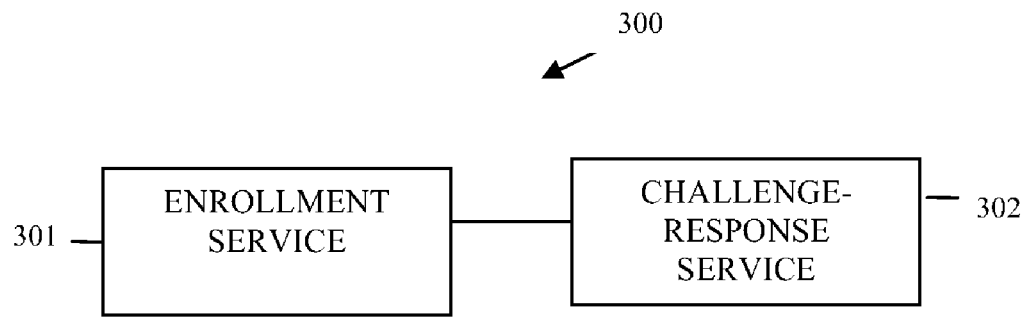
FIG. 3 is a diagram of a multilingual password reset and recovery system, according to an example embodiment.

FIG. 3 is a diagram of a multilingual password reset and recovery system 300, according to an example embodiment. The multilingual password reset and recovery system 300 is implemented in a machine-accessible and readable medium as instructions that process on one or more machines of a network. Moreover, the multilingual password reset and recovery system 300 is operational over the network; the network may be wired, wireless, or a combination of wired and wireless.

In an embodiment, the multilingual password reset and recovery system 300 implements, among other things, the establishment service and the password service represented by the methods 100 and 200 of the FIGS. 1 and 2, respectively.

The multilingual password reset and recovery system 300 includes a enrollment service 301 and a challenge-response service 302. Each of these will now be discussed in turn.

The enrollment service 301 is implemented in a machine-accessible and computer-readable medium as instructions that execute on a machine (computer or processor-enabled device) of the network. Example processing associated with the enrollment service 301 was presented in detail above with reference to the method 100 of the FIG. 1.

The enrollment service 301 defines a procedure for the challenge-response service 302 to implement and enforce when a requestor requests that an existing password of a valid end user be retrieved or a new password for the end user be established.

In an embodiment, the enrollment service 301 interacts with the end user and/or administrator to determine a total number of questions that is to be defined in the procedure. The enrollment service 301 also interacts with the end user and/or administrator to determine each of the spoken languages that is to be associated with each of the questions.

According to an embodiment, the procedure defined by the enrollment service 301 indicates that at least one question that is to be asked by the challenge-response service 302 is to be dynamically and in real time randomly selected by the challenge-response service 302 from a pool of available questions.

In some cases, the procedure defined by the enrollment service 301 also defines a communication mechanism that the challenge-response service 302 is to employ to deliver the existing password or the new password to the requester assuming each question is answered correctly in terms of content and present in the correct spoken language format.

The challenge-response service 302 is implemented in a machine-accessible and computer-readable medium as instructions that execute on the machine or an entirely different machine (processing device, computer, etc.) of the network. Example processing associated with the challenge-response service 302 was presented in detail above with reference to the method 200 of the FIG. 2.

The challenge-response service 302 follows the procedure established by the enrollment service 301. So, during a particular request from a particular requestor, the challenge-response service 302 serially presents questions to that particular requester and evaluates answers supplied back from the particular requester. When a particular answer is correct in terms of content and spoken language format expected by the procedure, the challenge-response service 302 asks another question dictated by the procedure. This continues until each question that is required to be asked is asked and answered correctly in terms of content and expected spoken language format. At which time, if all answers were correct the challenge-response service 302 communicates the existing password for the end user to the requester or communicates a new password for use by the end user. Furthermore, at least two questions are asked and each of these questions is in different spoken language formats. So, the process is multilingual.

In an embodiment, the challenge-response service 302 permits at least one answer to at least one question to be in a different spoken language format from that which is associated with the at least one question that was asked. So, a question is in one language and the answer is in an entirely different language.

It is noted that during the enrollment process that is processed by the enrollment service 301, all the questions and their spoken language formats may appear on a single screen for ease of use that permits the end user and/or administrator to define and answer them and define the languages. All these settings saved by the end user or administrator, is captured by the enrollment service 301 and represented in the procedure that the challenge-response service 302 enforces on subsequent requests to reset or recover the end user's password. So, the complexity can be end user and/or administrator-defined and driven. End users and/or administrators can also indicate which questions are required and which can be associated with a random pool of questions and can indicate how many questions are to be randomly produced. This provides tremendous user and/or administrator control.

But, it is also noted that enterprise policy may override end user configuration settings and enforce a minimal level of security in terms of requiring certain questions or requiring at least some multilingual questions and answers, etc.

Figure 4:
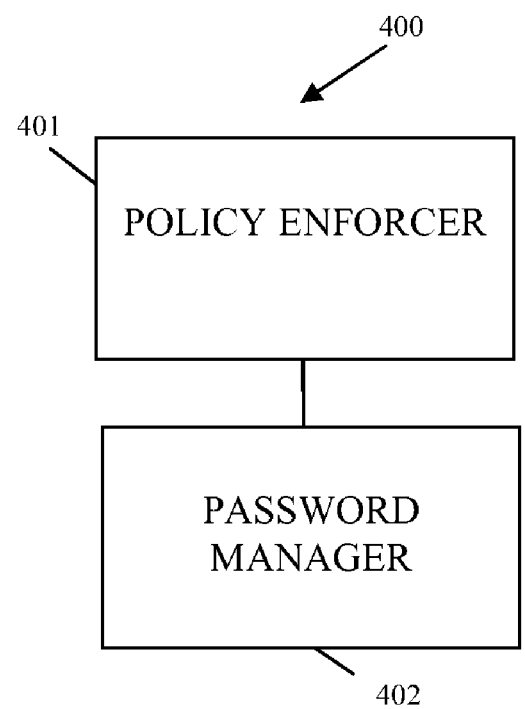
FIG. 4 is a diagram of another multilingual password reset and recovery system, according to an example embodiment.

FIG. 4 is a diagram of another multilingual password reset and recovery system 400, according to an example embodiment. The multilingual password reset and recovery system 400 is implemented in a machine-accessible and computer-readable medium and is processed on machines over a network. The network may be wired, wireless, or a combination of wired and wireless. In an embodiment, the multilingual password reset and recovery system 400 implements among other things the establishment service and the password service represented by the methods 100 and 200 of the FIGS. 1 and 2, respectively. Also, the multilingual password reset and recovery system 400 presents and alternative arrangement and perspective to the multilingual password reset and recovery system 300 discussed above with reference to the FIG. 3.

The multilingual password reset and recovery system 400 includes a policy enforcer 401 and a password manager 402. Each of these and their interactions with one another will now be discussed in turn.

The policy enforcer 401 is implemented in a machine-accessible and computer-readable medium as instructions that process on a machine of the network. Example processing associated with the policy enforcer was discussed above with reference to the methods 100 and 200 of the FIGS. 1 and 2, respectively and with respect to the system 300 of the FIG. 3.

The policy enforcer 401 supplies policy or procedures to the password manager 402. The policy enforcer 401 interacts with a end user and/or an administrator during a prior session (establishment session) to identify first and second challenge questions and first and second spoken languages that are to be associated with the questions.

In an embodiment, the policy established by the policy enforcer 401 instructs the password manager 402 to randomly acquire the second question from a pool of available questions to select from.

The password manager 402 is implemented in a machine-accessible and computer-readable medium as instructions that process on the machine or an entirely different machine of the network. Example processing associated with the password manager 402 was presented above with reference to the method 200 of the FIG. 2 and the system 300 of the FIG. 3.

The password manager 402 interacts with a requester during a session where the requester desires to reset an existing password for a valid end user or to acquire an existing password for that end user. Thus, during that session the requester supplies a valid end user identification for the end user.

Next, the password manager 402 consults the policy enforcer 401 to acquire the policy for the end user. The policy identifies a first challenge question in a first spoken language format that the password manager 402 then presents to the requester. The password manager 402 receives back from the requester a first answer. When the first answer is correct in terms of content and expected spoken language format (dictated by the policy), the password manager 402 uses the policy to identify a second challenge question that is then presented to the requester in a second and different spoken language format from that which was associated with the first challenge question. Again, the password manager 402 receives back from the requestor a second answer. When the second answer is correct in terms of content and expected spoken language format (dictated by the policy), the password manager 402 consults the policy to identify a communication mechanism that the password manager 402 is to use to deliver the existing password or the new password to the requester. The communication mechanism can include encryption and can be via any channel, email, text message, web site, etc.

According to an embodiment, the first answer is received from the requester in the second spoken language format even though the first question was in the first spoken language format.

In another case, the second answer is received from the requester in a third language format even though the second question was in the second spoken language format. Furthermore, the third spoken language is different from the first and second spoken languages.

It has now been demonstrated how security associated with automated password recover and reset procedures can be significantly improved. This is done via multilingual question and answer interactions where questions are serially asked and answered such that no question is presented if a prior question was not answered properly. Furthermore, some questions can be randomly generated in a dynamic and real time fashion.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method for password recovery or password reset using multilingual challenge and response security and executed on a computing device that causes the computing device to perform the method, comprising:

selecting, by the computing device, two or more challenge questions for a user, and the user providing answers during an automated procedure for recovering an existing password for the user or for resetting the existing password to a new password for the user;

identifying, by the computing device, a first spoken language for presentation of the two or more challenge questions to the user during the automated procedure;

randomly changing, by the computing device, the first spoken language to different spoken languages from question to question or permitting the user or an administrator to select the different spoken languages;

identifying, by the computing device, a second spoken language for the answers, the second spoken language chosen from the different spoken languages during the automated procedure, wherein the first spoken language is different from the second spoken language;

starting, by the computing device, the automated procedure so that during the automated procedure a requestor supplies a valid user identification of the user and a first question of the two or more challenge questions is presented in the first spoken language to the requestor and a first answer is expected from the requestor in the second spoken language;

presenting, by the computing device, a second question of the two or more challenge questions, when the first answer is correctly provided by the user in the second spoken language, the second question of the two or more challenge questions again presented in the first spoken language to the requestor and a second answer is again expected from the requestor in the second spoken language; and supplying, by the computing device, the existing password for password recovery to the requestor or the new password for password reset when the second answer is correctly provided by the user in the second spoken language, and wherein the second question of the two or more challenge questions is never presented to or discoverable by the requestor when the first answer to the first question of the two or more challenge questions is not correctly provided by the user in the second language.

2. The method of claim 1, wherein selecting two or more challenge questions further includes randomly generating at least one of the two or more challenge questions from a pool of available questions.

3. The method of claim 1, wherein selecting two or more challenge questions further includes identifying the two or more challenge questions and the corresponding answers from the user during an enrollment process for the automated procedure.

4. The method of claim 1, wherein selecting two or more challenge questions further includes determining a total number of the two or more questions for use in the automated procedure in response to a policy associated with the user.

5. The method of claim 4, wherein selecting two or more challenge further includes receiving the policy from the user during an enrollment process for the automated procedure.

6. The method of claim 1, further includes identifying the first spoken language and the second spoken language from preference selections made by the user during an enrollment process for the automated procedure.

7. The method of claim 1, further includes permitting at least one of the two or more challenge questions to be in a mixed spoken language that includes text for the first or the second spoken languages and other text for a still another third spoken language, wherein the third spoken language is different from the first and the second spoken languages.

8. A machine-implemented method for password recovery or password reset using multilingual challenge and response security and executed on a computing device that causes the computing device to perform the method, comprising:

receiving, by the computing device, a user identification of a valid user from a requestor, wherein the user identification is received from the requestor for purposes of recovering an existing password of the valid user or for purposes of resetting the existing password to a new password for the valid user;

presenting, by the computing device, a first challenge question to the requestor in a first spoken language;

acquiring, by the computing device, a first answer to the first challenge question from the requestor;

validating, by the computing device, that the first answer is correct;

presenting, by the computing device, a second challenge question to the requestor in a second spoken language, in response to the first answer is correct; wherein the second spoken language is different from the first spoken language; and wherein the first and the second spoken languages were selected by the valid user or an administrator during an enrollment process;

acquiring, by the computing device, a second answer to the second challenge question from the requestor;

validating, by the computing device, that the second answer is correct; and communicating, by the computing device, the existing password or the new password to the requestor in response to the second answer is correct; wherein the existing password communicated for recovering the existing password or the new password communicated for resetting the existing password.

9. The method of claim 8, wherein presenting the first challenge question further includes presenting the first challenge question with some text that is in a third spoken language, and wherein the third spoken language is different from the first and the second spoken languages.

10. The method of claim 8, wherein presenting the first challenge question further includes randomly selecting the first challenge question from a pool of available questions.

11. The method of claim 10, wherein presenting the second challenge question further includes randomly selecting the second challenge question from the pool of available questions.

12. The method of claim 8, further comprising:
presenting, by the computing device, a third challenge question to the requestor in the first or the second spoken language;
receiving, by the computing device, a third answer from the requestor; and
validating, by the computing device, that the third answer is correct.

13. The method of claim 8, wherein acquiring the second answer further includes acquiring the second answer in a third spoken language that is different from the first and second spoken languages.

14. The method of claim 8, wherein communicating the existing password or the new password to the requestor further includes accessing a communication policy to determine a mechanism to deliver the existing password or new password to the requestor.

15. A system for password reset or password recovery using multilingual challenge response security, the system comprising:
one or more processors;
one or more memories storing computer executable instructions that when executed by the one or more processors cause the one or more processors to:
select two or more challenge questions for a user, and the user providing answers during an automated procedure for recovering an existing password for the user or for resetting the existing password to a new password for the user;
identify a first spoken language for presentation of the two or more challenge questions to the user during the automated procedure;
randomly change the first spoken language to different spoken languages from question to question or permit the user or an administrator to select the different spoken languages;
identify a second spoken language for the answers, the second spoken language chosen from the different spoken languages during the automated procedure, wherein the first spoken language is different from the second spoken language;
start the automated procedure so that during the automated procedure a requestor supplies a valid user identification of the user and a first question of the two or more challenge questions is presented in the first spoken language to the requestor and a first answer is expected from the requestor in the second spoken language;
present a second question of the two or more challenge questions, when the first answer is correctly provided by the user in the second spoken language the second question of the two or more challenge questions again presented in the first spoken language to the requestor and a second answer is again expected from the requestor in the second spoken language; and
supply the existing password for password recovery to the requestor or the new password for password reset when the second answer is correctly provided by the user in the second spoken language, and wherein the second question of the two or more challenge questions is never presented to or discoverable by the requestor when the first answer to the first question of the two or more challenge questions is not correctly provided by the user in the second language.

16. The system of claim 15, wherein the computer executable instructions further cause the one or more processors to interact with the valid user to determine a total number of questions that is to be defined in the procedure.

17. The system of claim 15, wherein the computer executable instructions further cause the one or more processors to interact with the valid user to determine each of the different spoken languages.

18. The system of claim 15, wherein the computer executable instructions further cause the one or more processors to permit at least one answer to at least one question be in a different spoken language from that which is associated with the at least one question asked.

19. The system of claim 15, wherein the computer executable instructions further cause the one or more processors to indicate that at least one question asked by the challenge-response service is to be randomly selected from a pool of available questions.

20. The system of claim 15, wherein when each of the answers are correctly provided by the requestor, the executable instructions further cause the one or more processors to define a communication mechanism that the challenge-response service is to employ to deliver the existing password or the new password to the requestor.

21. A system for password reset or password recovery using multilingual challenge response security, the system, comprising:
one or more processors;
one or more memories storing computer executable instructions that when executed by the one or more processors cause the one or more processors to:
receive a user identification of a valid user from a requestor, wherein the user identification is received from the requestor for purposes of recovering an existing password of the valid user or for purposes of resetting the existing password to a new password for the valid user;

present a first challenge question to the requestor in a first spoken language;

acquire a first answer to the first challenge question from the requestor;

validate that the first answer is correct;

present a second challenge question to the requestor in a second spoken language, in response to the first answer is correct; wherein the second spoken language is different from the first spoken language; and wherein the first and the second spoken languages were selected by the valid user or an administrator during an enrollment process;

acquire a second answer to the second challenge question from the requestor;

validate that the second answer is correct; and communicate the existing password or the new password to the requestor in response to the second answer is correct; wherein the existing password communicated for recovering the existing password or the new password communicated for resetting the existing password.

22. The system of claim 21, wherein the computer executable instructions further cause the one or more processors to interact with the valid user in an enrollment process to define the policy, and wherein the policy identifies the first and second questions and the first and second spoken languages.

23. The system of claim 21, wherein the policy instructs the computer executable instructions to further cause the one or more processors to randomly acquire the second question from a pool of available questions.

24. The system of claim 21, wherein the first answer is received in the second spoken language.

25. The system of claim 21, wherein the second answer is received in a third spoken language, and the third spoken language is different from the first and second spoken languages.

* * * * *